Figures 1, 2:
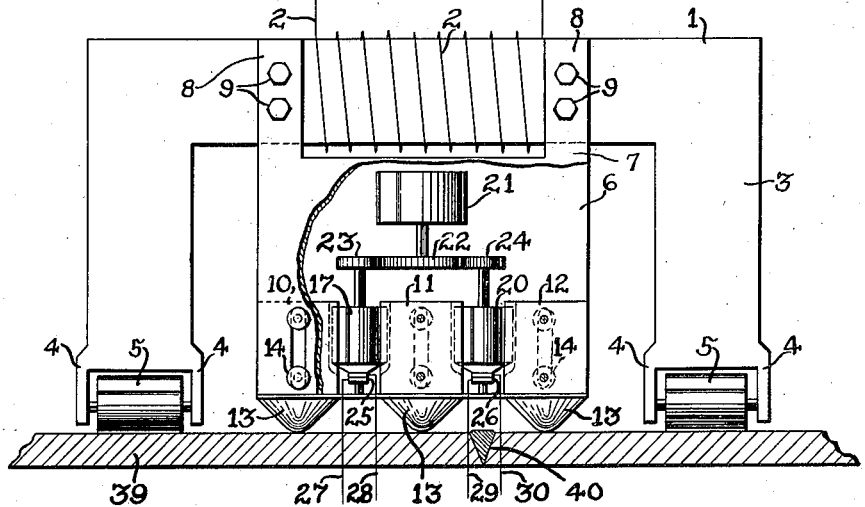

Oct. 2, 1928.

T. SPOONER 1,685,965

MAGNETIC TESTING APPARATUS AND METHOD OF TESTING

Filed Sept. 27, 1922

WITNESSES:
R. J. Butler
J. C. Bierman

INVENTOR
Thomas Spooner.
BY
Wesley G. Carr
ATTORNEY

Patented Oct. 2, 1928.

1,685,965

UNITED STATES PATENT OFFICE.

THOMAS SPOONER, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MAGNETIC TESTING APPARATUS AND METHOD OF TESTING.

Application filed September 27, 1922. Serial No. 590,813.

This invention relates to a magnetic testing apparatus and a method of testing, more particularly to an apparatus and method adapted for testing the efficiency of welded portions of various forms of iron or steel, and especially of plates having welded seams therein.

This invention is closely related to, and constitutes a modification of, the apparatus described and claimed in Patent No. 1,440,470, issued Jan. 2, 1923, to Isaac F. Kinnard, for a method of and apparatus for testing welds and assigned to the Westinghouse Electric & Manufacturing Company. In the aforesaid patent an apparatus is disclosed which comprises a core of magnetic material having coils wound thereon through which a magnetizing current, which may be either direct or alternating, is passed. The core is so placed upon the material to be tested that flux therefrom passes through the welded portion and a portion of the original material adjacent thereto. Said portions are bridged by three contact members or electrodes between which coils mounted upon magnetic or non-magnetic cores are inserted, said coils being differentially connected and inserted in a suitable indicating circuit. This instrument is capable of measuring the difference in the potential drop across the weld and across a similar section of the original metal adjacent thereto, thereby indicating the quality of the welded portion, as compared with the original metal.

My invention is directed to an apparatus and a method similar to those above described, it being among the objects thereof to provide an apparatus which shall be relatively simple in construction, which may be readily manipulated by an inexperienced operator and which shall indicate the quality of a welded portion of the parts to be tested.

It is a further object of this invention to provide an apparatus embodying a plurality of rotating armatures or rotors so connected in a circuit as to indicate the magnetic potentials across the parts being tested and thereby indicate the relative quality of a weld, as compared with the original metal.

In practising my invention, I provide a core member of magnetic material which has a magnetizing coil thereon and which is supported on rollers making contact with the material to be tested. Depending from the core is a yoke carrying three contact members or electrodes between which are mounted two vertical armatures or rotors which are rotated in opposite directions by means of a motor and suitable gears mounted on said yoke. The armatures are provided with slip rings and are so connected that the voltages generated therein are opposing, that is, are 180° out of phase. A telephone receiver is connected in series with said armatures and is shunted by two resistors which may be so adjusted that the noise obtained in the telephone receiver is a minimum.

In the accompanying drawings constituting a part hereof and in which like reference characters indicate like parts, Fig. 1 is a diagrammatic view of an apparatus embodying my invention, and Fig. 2 is an inverted plan view thereof, some parts being shown diagrammatically.

I provide a core 1 of magnetic material upon which is placed a magnetizing coil or winding 2. The legs 3 thereof are provided with extensions 4 between which are journaled rollers 5 adapted to make contact with the parts to be tested.

A yoke, consisting of plates 6 and 7 of non-magnetic material having extensions 8 bolted to the upper part of core 1 by means of bolts 9, has three electrodes or contact members 10, 11 and 12 having lower ends 13 pointed, said members being adjustably secured in slots in said plates by pins 14 and uniformly spaced. The adjacent sides of electrodes 10 and 11 are recessed at 15 and 16 to provide pole pieces, and a rotor or armature 17 is rotatably mounted between them. In a similar manner, the adjacent faces of electrodes 11 and 12 are recessed at 18 and 19, and an armature 20 is mounted between them. A motor 21 having a gear wheel 22 secured thereto, is mounted on the yoke, and pinions 23 and 24, adapted to rotate in opposite directions and secured to the shafts of armatures 17 and 20, respectively, are driven by means of said motor 21 and gear wheel 22. Armatures 17 and 20 are respectively provided with slip rings 25 and 26 to which leads 27 and 28 and leads 29 and 30 are respectively connected by means of suitable contact brushes.

The diagram of connections of the indicating circuit is shown in Fig. 2. Leads 27 and 28 are connected by a resistor 32 and leads 29 and 30 are connected by a resistor 33. An adjustable connector 34 is interposed between resistors 32 and 33 and a telephone receiver 31 is also connected between them by means of adjustable contact devices 35 and 36.

The operation of the device is as follows: The coil 2 is energized by direct current and the connector 34 and contact devices 35 and 36 are so adjusted as to be symmetrically disposed to give equality when the apparatus is applied to a uniform, unwelded plate. This adjustment eliminates any differences resulting from the armatures or pole pieces. The apparatus is then placed upon a plate 39 to be tested. Electrodes 10 and 11 bridge a part of the original material and electrodes 11 and 12 bridge the welded portion 40, the quality of which is to be tested. Motor 21 is caused to rotate at a speed which corresponds to the maximum sensitiveness of the telephone receiver, thereby rotating armatures 17 and 20. The magnetic potentials at the points of contact of the electrodes 10, 11 and 12 produce magnetic fields in the pole pieces, thereby inducing currents in the rotating armatures. By reason of the connections thereof to the telephone receiver 31, a sound will be produced in said receiver. Contact devices 35 and 36 are then manipulated over their respective resistors 32 and 33 until the sound produced in the receiver is a minimum. As it is not necessary to move both contactors, one of them may be made stationary.

From the relative values of the resistances in the circuit, the relative fluxes between each pair of pole pieces may be calculated. This differential is a measure of the quality of the weld, since the magnetic reluctance is inversely proportional to the quality thereof. If the weld has a poor quality, its magnetic reluctance will be higher, and more leakage flux will pass between electrodes 11 and 12 than between electrodes 10 and 11, thereby providing a basis for the true measure of the quality of said weld.

Although I have described a specific embodiment of my invention it will be obvious to those skilled in the art that various modifications may be made in the details of construction, such as in the design and arrangement of the several cooperating parts, without departing from the principles herein set forth.

I claim as my invention:

1. A method of magnetic testing which comprises passing magnetic flux through the parts to be tested, bridging said parts by electrodes, rotating armatures therebetween and acoustically measuring the relative magnitude of the voltages induced therein by connecting said armatures in series with a telephone receiver, shunting said receiver by resistors and adjusting the values thereof until a minimum of sound is produced in said receiver.

2. A method of magnetic testing which comprises passing magnetic flux through a welded body to be tested, bridging the weld and an adjacent portion of said body by three electrodes, rotating armatures therebetween and acoustically measuring the relative magnitude of the voltages induced therein by connecting said armatures in series with a telephone receiver, shunting said receiver by resistors and adjusting the values thereof until a minimum of sound is produced in said receiver.

3. Apparatus for testing a piece of metal having a strained place, comprising means for passing a magnetic flux through said piece across said strained place and an adjacent unstrained place, a pair of magnetic yokes comprising contact members for simultaneously shunting off a portion of the magnetic flux through shunt paths of equal reluctances at both of said places, dynamo means for securing electromotive forces of rotation responsive to the fluxes in the respective shunt paths, and means for comparing said electromotive forces.

4. Apparatus for testing a piece of metal having a strained place, comprising means for passing a unidirectional magnetic flux through said piece across said strained place and an adjacent unstrained place, a pair of magnetic yokes comprising contact members for simultaneously shunting off a portion of the magnetic flux through shunt paths of equal reluctances at both of said places, means for securing alternating electromotive forces responsive to the fluxes in the respective shunt paths, and means for comparing said electromotive forces.

5. Apparatus for testing a piece of metal having a strained place, comprising means for passing a magnetic flux through said piece across said strained place and an adjacent unstrained place, three magnetizable contact members contacting with the same surface of said piece, one on one side and the other two on the other side of said strained place, the opposed side faces of said contact members being recessed to provide dynamo-electric machine pole pieces, two armature rotors disposed one between each of the pairs of said opposed side faces, means for rotating said rotors, and means for comparing the electromotive forces generated thereby.

6. Apparatus for testing a piece of metal having a strained place, comprising means for passing a magnetic flux through said piece across said strained place and an adjacent unstrained place, three magnetizable contact members contacting with the same surface of said piece, one on one side and the other two on the other side of said strained place, the opposed side face of said contact members being recessed to provide dynamo-electric machine pole pieces, two armature rotors disposed one between each of the pairs of said opposed side faces, means for rotating said rotors, and means for comparing the electromotive forces generated thereby, said contact members being susceptible of a limited movement parallel with the axes of said rotors and substantially normal to the surface of said test piece to allow for irregularities in said surface.

7. Apparatus for testing a piece of metal having a strained place, comprising means for passing a magnetic flux through said piece across said strained place and an adjacent unstrained place, three magnetizable contact members contacting with the same surface of said piece, one on one side and the other two on the other side of said strained place, the opposed side faces of said contact members being recessed to provide dynamo-electric machine pole pieces, two armature rotors disposed one between each of the pairs of said opposed side faces, means for rotating said rotors, and means for comparing the electromotive forces generated thereby, said contact members having rounded contact ends and being mounted to provide a limited movement parallel with the axes of said rotors and substantially normal to the surface of said test piece to allow for irregularities in said surface.

In testimony whereof, I have hereunto subscribed my name this 21st day of September, 1922.

THOMAS SPOONER.